April 8, 1969      J. O. LERNER      3,438,020
APPARATUS FOR DETECTING OBJECT MOVEMENT
Filed Jan. 3, 1966
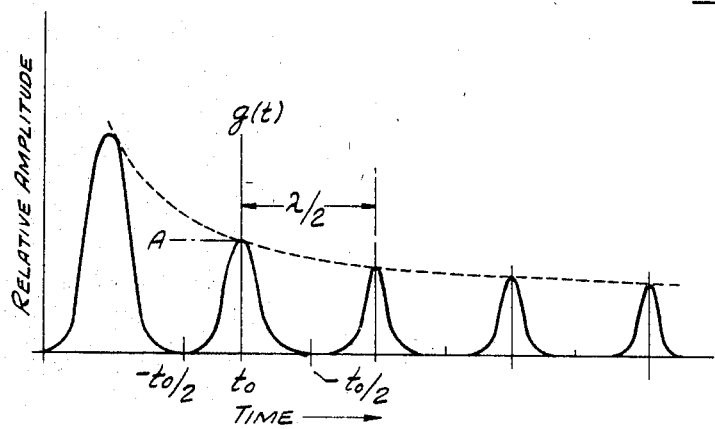
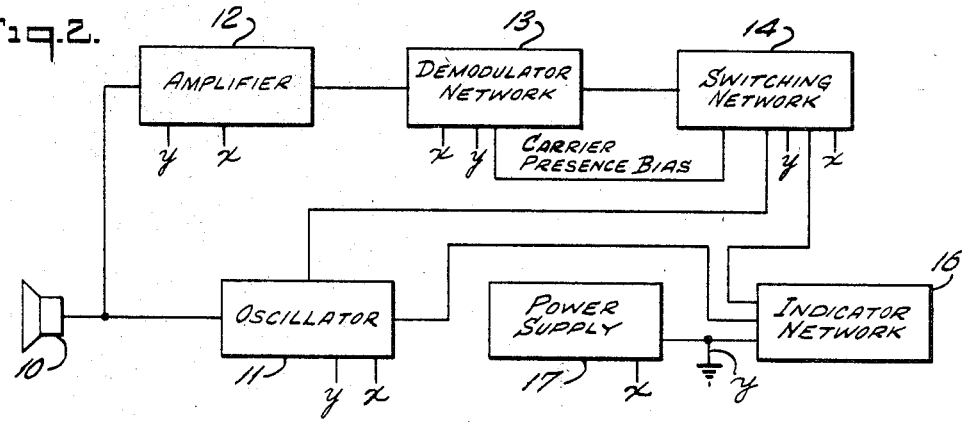
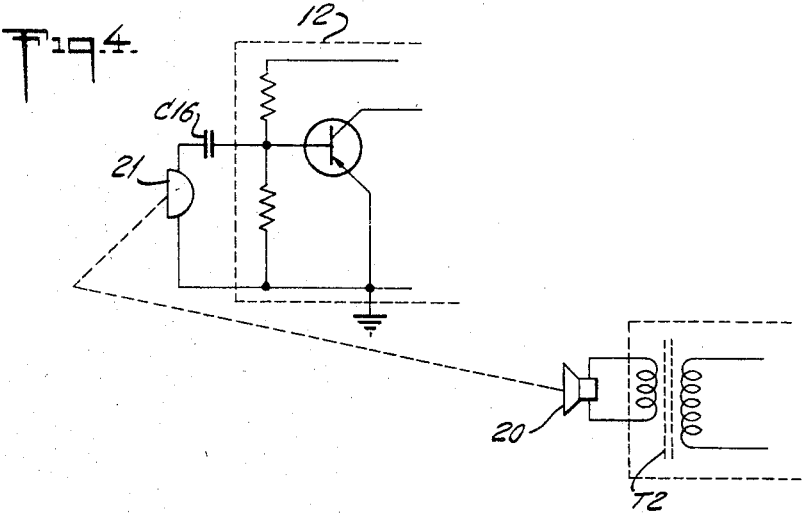
INVENTOR
JULIUS O. LERNER
BY
William R. Liberman
ATTORNEY

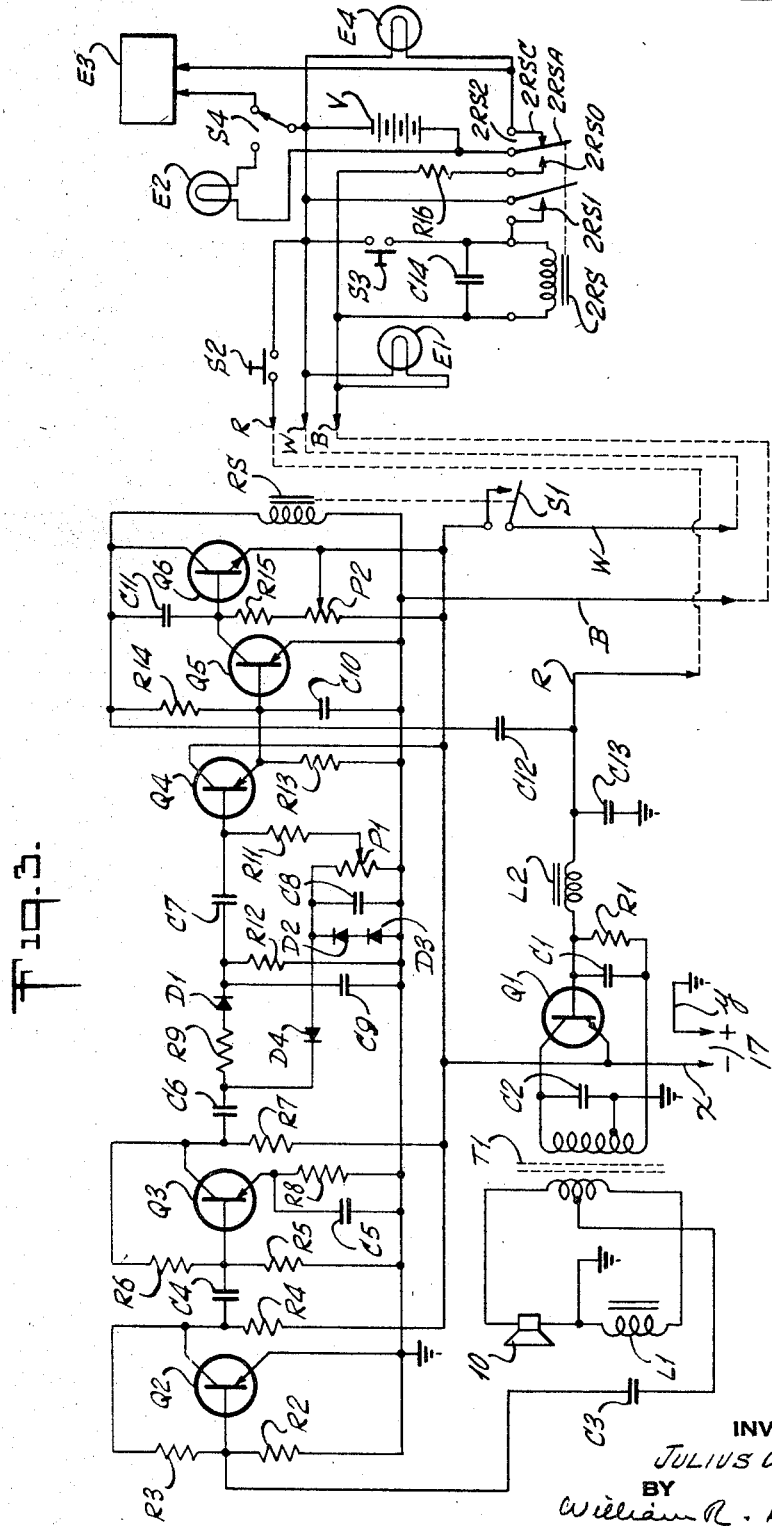

3,438,020
APPARATUS FOR DETECTING OBJECT MOVEMENT

Julius O. Lerner, Verona, N.J., assignor of fifty percent to David Herman, Livingston, N.J.
Filed Jan. 3, 1966, Ser. No. 518,250
Int. Cl. G08b 13/24
U.S. Cl. 340—258                                17 Claims

ABSTRACT OF THE DISCLOSURE

A moving object detector includes a preferably supersonic oscillator coupled to an electro-mechanical transducer such as a speaker unit which is coupled to and establishes a standing wave field in a monitored space, the field varying with time in the presence of a moving object. The standing wave is picked up and transduced to a corresponding electric signal which is demodulated and the demodulated signal controls an alarm in response to the modulation. The oscillator is controlled by the demodulated signal to increase the oscillator output with an increase in the demodulated signal whereby to increase the detector sensitivity and stability.

---

The present invention relates generally to improvements in the field of object detection and in particular it relates to an improved apparatus for the detection of a moving object.

It is frequently desirable to detect a foreign object or intruder in a predetermined area and many systems have been employed for this purpose, including light intercepting and reflecting systems, capacity detecting systems, systems for detecting frequency changes of electromagnetic or mechanical oscillations reflected from a moving object due to the Doppler effect, and the like. Certain of these conventional systems have limited application yet they possess numerous drawbacks and disadvantages. They require the use of complex and expensive devices and have little versatility and adaptability. Furthermore, they are frequently of little sensitivity, unreliable and responsive to spurious signals, transients, and background noise and otherwise leave much to be desired.

It is, therefore, a principal object of the present invention to provide an improved apparatus for the detection of a moving object.

Still another object of the present invention is to provide an improved apparatus for the detection of a moving object, which apparatus is of high stability and sensitivity and unresponsive to spurious signals, transients and noise.

A further object of the present invention is to provide an improved moving object detection and alarm apparatus where a signal is furnished upon power failure or any deficiency in the operation of the apparatus.

Still a further object of the present invention is to provide an apparatus of the above nature characterized by its reliability, versatility, adaptability and low cost.

The above and other objects of the present invention will become apparent from a reading of the following description taken in conjunction with the accompanying drawings, wherein:

FIGURE 1 is a diagram of the detected carrier signal envelope, when modulated by the presence of a moving object;

FIGURE 2 is a block diagram of an apparatus embodying the present invention;

FIGURE 3 is a circuit diagram thereof; and

FIGURE 4 is a circuit diagram of part of a modified form of the present apparatus.

The present invention contemplates the provision of a moving object detection apparatus comprising a first means for generating a mechanical oscillatory carrier signal and coupling said carrier signal to a propagation medium, said first means being responsive to said carrier signal reflected from a moving object variably to modulate said carrier signal, and second means responsive to said variably modulated carrier signal for providing an indication of said moving object.

According to a preferred form of the present apparatus the generator produces an ultrasonic signal and includes a reciprocal or bilateral electromechanical transducer, specially a high frequency permanent magnet speaker including a diaphragm or transmitter and loosely coupled, such as by a high leakage transformer, to the output of a transistor oscillator whereby to minimize the oscillator damping of the speaker. While the oscillator advantageously has a frequency in the ultrasonic range, it may be in the audio range, the term sonic being applied to the full range of frequencies. The second means includes an amplifier coupled to the speaker, for example by way of a microphone coupled to the speaker through the propagation medium and connected to the amplifier input, or the amplifier input is electrically coupled to the electrical end of the speaker. A transistor switch network alternatively actuatable to opposite first and second states has its output coupled to the indicating device to actuate the latter when the switching network is in its first state, which first state is the network normal state. A bias supply energized by the carrier frequency output of the amplifier is connected to the input of the switching network to maintain it releasably in its second state, but releases it to its first state upon the absence of a carrier frequency output from the amplifier. A demodulating network is connected to the output of the amplifier and applies the varying demodulated amplifier output to the switching network input, and, when the demodulator output is sufficiently high it actuates the switch to its first state. Demodulated carrier amplitude variations are fed, as a control signal, to the oscillator transistor input so as to vary oscillator output according to the variations in original carrier modulation; an important feature which increases the sensitivity of the apparatus while rejecting short duration or transient interference, and maintaining high stability.

The present appaartus employs the relatively sharp amplitude bursts of oscillatory mechanical or sonic energy produced at the sonic generator by superposition of received reflected sonic energy of the same frequency, upon the transmitted wave energy or carrier, according to Hugghen's principle of superposition, and the consequent forced vibration of the transmitter, not only according to the original driving carrier amplitude, but also according to the resultant amplitude burst, with consequent generation of the burst signal pattern, available at the terminals of the speaker by the fact that it is a reciprocal transducer.

The reflected carrier waves incident on the transmitter, if complete reflection is assumed, and neglecting attenuation, have a displacement amplitude which can vary from zero to twice the original carrier amplitude $a$ with an instantaneous value:

$$b = 2a \sin Kvt \sin Kx$$

at a time $t$, when the moving object is $x$ distance from the transmitter, where $$K = \frac{2\pi}{\text{wave length}}$$

and $v$ is the propagation velocity in air. Peak values occur at half wave length intervals, and the repetition rate depends on the velocity of the moving object. At the transmitter, forced vibration due to superposition of transmitted waves, received reflected waves, together with transient displacement due to the intermittant amplitude of the first two forces, together with relatively light damping and phase differences between the driving forces and the actual excursions of the transmitter give rise to variations in loading by the transmitter upon the transmitter driver, with amplitude bursts having an envelope of a pulse nature, see FIGURE 1.

The three term expression for transmitter displacement is:

$$d = A e^{-\Delta t} \sin(Wt - \theta) + \frac{F_1}{w_1 z} \cos(wt - \phi_1) + \frac{F_2}{w_2 z} \cos(w_2 t - \phi_2)$$

where
A=steady state amplitude,
e=base of natural logarithm,
t=instantaneous time of function,
$\Delta t$=damping factor,
w=resonant frequency of transmitter,
z=mechanical impedance of transmitter,
$\theta$=phase angle of transient force with actual displacement,
$F_1 \cos w_1$=vector of driving signal force,
$F_2 \cos \omega_2$=vector of reflected signal force,
$\phi$=phase angle between applied force and actual displacement.

When demodulated, the amplitude bursts referred to approximate a train of cosine-squared pulses whose repetition rate depends on the rate of movement of the reflecting object, and whose amplitude diminishes exponentially with distance, and whose form may be expressed as a time function by:

$$g(t) = A \cos^2 \pi \frac{t}{t_0}$$

and is illustrated in FIGURE 1 of the drawings assuming that the reflecting object is moving at a constant velocity.

Referring now to the drawings, and particularly FIGURES 2 and 3 thereof which illustrate a preferred embodiment of the present invention, reference numeral 10 designates a reciprocal electromechanical transducer loosely coupled to the output of a transistor oscillator 11, preferably of a frequency in the low ultrasonic range, for example about 18,000 c.p.s. A signal derived from the transducer 10 which varies in accordance with the incident reflected carrier is applied to the input of an AC amplifier 12 the output of which is connected to a demodulator network 13 which produces a switching network control signal in accordance with the variation or modulation envelope of the carrier input to the amplifier 12, and a switch biasing signal in accordance with the presence of a carrier signal at the output of amplifier 12. Both output signals from the demodulator 13 are applied to the control input of a switching network 14 which is normally in a first or alarm state and is maintained in a second state by the biasing signal in the presence of a carrier and is switched to its first state by an adequate demodulated carrier signal. The demodulated carrier signal is also fed as a control signal to oscillator 11 to increase the output thereof directly with the amplitude of the demodulated signal. The output of the switching network 14 is applied to a control and alarm network 16 which may be remotely positioned and functions to provide a sensible signal in the presence of a moving object and to test the operation of the apparatus.

The various components of the detection apparatus are powered by any suitable power supply 17 whose negative terminal is connected to a line x and whose positive terminal is connected to a grounded line y. Oscillator 11 is a modified Armstrong type oscillator and includes a transistor Q1 and employs as a tank circuit part of the primary winding of a transformer T1, the other part of the primary winding providing the positive feedback. The transformer primary is connected in series with a capacitor C1 paralleled by a resistor R1 between the collector and base of transistor Q1, capacitor C1 being connected to the base. A capacitor C2 has one terminal connected to the transistor collector and its other end connected to a tap on the transformer primary and to ground. The transistor Q1 emitter is connected to negative line x.

The transducer 10 is advantageously an inexpensive, small, permanent magnet, voice coil driven diaphragm speaker of conventional construction and preferably provided with a relatively weak magnet so as to be poorly damped. The input to speaker 10 is connected through an inductor L1 across the secondary of the transformer T1, the junction of the speaker 10 and inductor L1 being grounded. In order to minimize damping by the oscillator on the speaker 10, a loose coupling is effected between the speaker and oscillator by employing a transformer T1 of high leakage, such as a ferrite core transformer having an air spacing.

The amplifier 12 is an AC coupled two stage amplifier including transistors Q2 and Q3 the base of the transistor Q2 being connected through a capacitor C3 to a center tap on the secondary of transformer T1 and the emitter being grounded to line y. It should be noted that there is some unbalance between the transformer secondary tap and the grounded junction of inductor L1 so that even in the absence of an incident reflected signal on transducer 10 a carrier signal of the frequency of the oscillator 11 is applied to the base of transistor Q2. The base of transistor Q2 is also grounded through a resistor R2 and connected through a resistor R3 to the collector of transistor Q2 which, in turn, is connected through a resistor R4 to negative line x and through a coupling capacitor C4 to the base of capacitor Q3.

The base of transistor Q3 is grounded through a resistor R5 and connected through a resistor R6 to the collector thereof which is connected through a resistor R7 to negative line x. The emitter of transistor Q3 is grounded through parallel connected resistor R8 and capacitor C5.

The demodulating network includes, connected successively in series from the collector of transistor Q3 to the base of a PNP transistor Q4, a coupling capacitor C6, an isolating resistor R9, a diode D1 and a DC isolating low frequency pass capacitor C7. The junction point of capacitor C6 and resistor R9 is connected in series through a blocking diode D4 and a pair of series diodes D2 and D3 to ground. A charge capacitor C8 is connected across diodes D2 and D3 and is shunted by the resistance element of a potentiometer P1 the arm of which is connected through a resistor R11 to the base of transistor Q4. The junction of the diode D1 and capacitor C7 is grounded through parallel connected carrier frequency pass capacitor C9 and load resistor R12.

The collector of transistor Q4 is connected to line x and the emitter is grounded through a load resistor R13 and is connected to the base of a PNP transistor Q5. The base of transistor Q5 is connected through a capacitor C10 to ground and through a series connected resistor R14 and capacitor C11 to the base of an NPN transistor Q6. The emitter of transistor Q5 is grounded and the collector thereof is connected to the base of transistor Q6 and through the series connected resistor R15 and the resistance element of a potentiometer P2 to line x. The emitter of transistor Q6 is connected to the arm of potentiometer P2 and to line x. The collector of transistor Q6 is connected to the junction of resistor R14 and capacitor C11 and through the solenoid of a relay RS1 to ground, the solenoid upon sufficient energization actuating a normally open switch S1.

The output level of oscillator 11 is controlled in response to variations in the modulated carrier signal by the demodulated carrier signal. To this end, the base of transistor Q1 is connected through a carrier frequency blocking inductor L2 and a DC isolating capacitor C12 in series to the junction of resistor R14 and capacitor C11. The junction of inductor L2 and capacitor C12 is grounded through a charge and bypass capacitor C13.

The indicator and control network 16 may advantageously be remotely positioned from the remainder of the network and is connected thereto by a three-conductor cable including three lines R, B and W, the line R being connected through inductor L2 to the base of oscillator transistor Q1, the line B being connected to ground line $y$ and line W being connected through relay switch S1 to line $x$. At the indicator network, the line R is connected through a normally open push button switch S2 to line W and an indicator lamp E1 is connected between lines W and B.

The solenoid of a relay 2RS is connected through a normally open push button switch S3 between lines W and B and is shunted by a time delay capacitor C14. Actuated by the solenoid of relay 2RS are a first normally open hold switch 2RS1 and a double throw switch 2RS2 including a solenoid actuated switch arm 2RSA, normally open contact 2RSO and normally closed contact 2RSC. Push button switch S3 is shunted by relay hold switch 2RS1. The normally open relay contact 2RSO is connected through a limiter resistor R16 to line B. The relay switch arm 2RSA is connected to one pole of a double throw switch S4 through an indicator lamp E2, and is connected to the plus terminal of a battery V, the minus terminal of which is connected to line W. The arm of switch S4 is connected to line W. The other pole of switch S4 is connected through an electrically energized bell E3 or other alarm device to relay contact 2RSC. An indicator lamp E4 is connected between line W and relay contact 2RSC.

Considering now the operation of the apparatus described above, under normal operating conditions and in the absence of a moving object in the range of the apparatus, switch S3 is momentarily closed to connect relay solenoid 2RS across lines W and B thereby connecting the solenoid across power lines $x$ and $y$ through the relay closed switch S1 and thereby energizing relay 2RS and closing hold switch 2RS1. The closed hold switch 2RS1 maintains the relay solenoid 2RS energized to maintain the normally open relay contact 2RSO closed and normally closed contact 2RSC open. Closed contact 2RSO connects battery V through resistor 16 across lines W and B to effect the charging of battery V during the dormant period and the open contact 2RSC breaks the energizing circuit of the alarm bell E3.

The carrier signal applied to the base of transistor Q2 as derived from the oscillator transducer coupling network or otherwise is amplified by transistors Q2 and Q3 and applied through capacitor C6 and diode D4 to the diodes D2 and D3 and a DC potential equal to the forward drop across these diodes accumulates a corresponding potential on capacitor C8. The potentiometer P1 is adjusted to a point where the bias applied to transistor Q4 base as derived from capacitor C8 is sufficient to maintain the switching network with transistor Q6 in a saturated conducting state whereby to maintain relay solenoid RS1 energized and switch S1 closed. However, in the absence of a carrier signal applied across diodes D2 and D3, due to a failure of the oscillator, the amplifier, or other component effecting the application of the carrier signal, the bias applied to transistor Q4 base is removed, thereby to actuate switching network 14 and drive transistor Q6 to cut off, opening relay switch S1 and actuating the alarm bell as will be hereinafter set forth.

In the presence of a moving object in the range of the subject detection apparatus, the carrier signal emitted by the speaker 10 is reflected by the moving object and is incident on the speaker unit to produce a modulated carrier of the configuration and amplitude and dependent on the velocity of movement of the moving object in the manner described above. Since speaker 10 is a reciprocal or bilateral transducer the electrical signal corresponding to the thus-modulated carrier is derived from between the tap on the secondary of transformer T1 and the junction of speaker 10 and inductor L1 and is applied to the base of transistor Q2. The modulated carrier is amplified by transistors Q2 and Q3 and is demodulated and applied initially as small rectified positive going bursts by means of the demodulating network including diode D1, resistor R12 an capacitor C9, through capacitor C7 to the base of transistor Q4 and tend to drive transistor Q4 toward cut off.

A reduction emitter current of transistor Q4 causes a positive going drop in potential at its emitter, across load resistor R13, which is connected to the base of PNP transistor Q5 and also tends to drive transistor Q5 toward cut off. The collector of transistor Q5 is direct coupled to the base of NPN transistor Q6 and the reduction in its collector current through its collector load resistors R15 and P2, impresses a negative going voltage to the base of transistor Q6 which tends to drive transistor Q6 toward cut off. Unless the original signal bursts are of great enough amplitude, the preceding sequence is not sufficient to drive transistor Q6 to cut off and denergize relay RS1.

Since transistor Q6 is saturated, its collector is practically at its emitter potential, or negative, and feed back through resistor R14 connected from the collector of transistor Q6 to the base of transistor Q5 tends to keep the pair of transistors stable and conducting. Capacitor C12 connected from the collector of transistor Q6 to the base of transistor Q1 through inductor L2 has no steady state effect on oscillator 11 of which transistor Q1 is part. When the positive pulses ordinarily insufficient to cut off transistor Q6 reach the base of transistor Q1 through capacitor C12 and choke L2, they cause increased collector current in transistor Q1 and consequently a larger oscillator output for the duration of the pulse. The larger output drives speaker 10 to a larger output and enhances the amplitude of the signal reflected from the moving object. A rapid cumulative rise in pulse amplitude an burst amplitude feed each other in regenerative sequence until a latching sequence is initiated.

The potential communicated to the base of transistor Q5 through resistor R14 is negative while transistor Q6 is near saturation, but as transistor Q6 conducts less its collector becomes increasingly positive since there is less voltage drop in relay solenoid RS1, and this positive potential now tends to cut off transistor Q5 and, therefore, transistor Q6. This further enhances the positive going pulse to the base of transistor Q1, increases the regenerative sequence described above. Capacitor C10 together with feed back resistor R14 provide a relatively along time constant and prevent high frequency instability. Capacitor C11 is multiplied by the Miller effect and appears virtually across the relay solenoid RS1 and its purpose is to prolong the opening of the relay switch S1 during each pulse. Potentiometer P2 functions as part of the collector load of transistor Q5 and its adjustment varies the back bias on the base of transistor Q6 and serves as a sensitivity control. Inductor L2 conducts long duration pulses to transistor Q1 as described above and also prevents the carrier frequency from being fed back to the switching network. Capacitor C13 by-passes the carrier frequency to ground in conjunction with inductor L2. Thus, an important feature of the present network is that a small initial signal, without a cascading of high gain amplifiers, can be built up to a large effective pulse. It can also be seen that the switching network is regeneratively turned on and is stable in the absence of signal, and regeneratively turned off and stable during a signal pulse by reason of change in the polarity imposed at the base of transistor Q5 through resistor R14.

The cumulative pulse build up and the increase in oscillator output are not unlimited or runaway, first because the positive drive to the base of the oscillator transistor Q1 is AC coupled through capacitor C12 and cannot have a steady state in the absence of a pulse of signal, and secondly because the rectified carrier signal causes turn on the transistors Q4, Q5 and Q6 as soon as a signal pulse ceases, and once turned on, further latch-in of the turned on state occurs because of forward bias feed back to the base of transistor Q5 through resistor R14 aiding the turn on signal from transistor Q4 due to the bias derived from the carrier signal.

Upon the opening of switch S1, as described above, for a period or for an aggregate period of closely spaced openings of switch S1 sufficient to permit the discharge of capacitor C14 through relay solenoid 2RS by reason of the opening of the power line W, the energizing circuit of relay solenoid 2RS being broken, the solenoid becomes deenergized. The capacitor C14 furnishes a time delay which prevents opening of the relay due to transients or opening of switch S1 of such short duration as to be of little significance. The deenergization of solenoid 2RS opens switch 2RS1 to return the relay in its open position, opens relay contact 2RSO and closes relay contact 2RSC. With the switch S4 in the position illustrated, the release of relay 2RS to close contact 2RSC completes the energization circuit between bell E3 and battery V to provide an audible alarm.

Indicator lamp E1, when energized, indicates that relay switch S1 is closed and hence indicates the powering of the detection network and the absence of a moving object in detection range. The indicator lamp E4, when energized due to the closing of relay contact 2RSC, furnishes a visual indication, independent of the position of switch S4, of the presence of an alarm condition. Indicator lamp E2, when activated by the positioning of switch S4, provides a visual indication to an attendant during the test procedure that bell E3 is disabled. By momentarily closing switch S2 to short lines R and W the forward bias on Q1 is removed to disable the oscillator 11, remove the carrier-derived hold bias on the base of transistor Q4 to effect the de-energization of relay RS1 and the opening of switch S1 with the resulting deenergization of relay solenoid 2RS and the energization of indicator E2 or E3 depending on the position of switch S4. The above procedure provides a test of the operating state of circuits of the present network.

In FIGURE 4 there is illustrated another embodiment of the present invention which differs from that described above only in the network shown in FIGURE 4. Primarily, instead of the coupling between the speaker or transmitter 10 and the amplifier 12 being electrically effected as in FIGURE 2, such coupling is effected sonically through the propagation medium. Specifically, the speaker or transducer 20 in FIGURE 4 which corresponds to speaker 10 in FIGURE 2 is connected across the secondary of transformer T2 which corresponds to transformer T1, the primary thereof forming part of the oscillator network. A microphone 21 is connected through a coupling capacitor C16 across the input to the amplifier 12. Except for the absence of inductor L1 and the electrical connection between the speaker coupling network and the amplifier 12 the present embodiment is otherwise the same as that first described.

In the operation of the apparatus last described the sonic carrier and the sonic amplitude bursts produced as previously described are transmitted from speaker 20 through the propagation medium to microphone 21 where they are converted to electrical signals applied to the input of amplifier 12. The carrier signal reaching the amplifier 12 is attenuated by the attenuation of the sonic carrier in the propagation medium and does not overdrive the amplifier, thereby obviating the need of the nearly balanced circuit of the speaker 10, inductor L1 and tapped transformer secondary. In all other respects the operation of the apparatus last described is similar to that first described.

I claim:

1. A moving object detection apparatus comprising a first means for continuously generating a mechanical oscillatory carrier signal and coupling said carrier signal to a propagation medium and producing an amplitude modulated electrical carrier signal derived from said mechanical oscillating carrier signal in said propagation medium as amplitude modulated by the presence therein of a moving object, second means responsive to a varying modulation of said variably modulated carrier signal for providing an indication of said moving object, and a third means responsive to said varying modulation for increasing the output level of said carrier signal generating means with an increase in the amplitude of said modulation.

2. The apparatus of claim 1, wherein said first means comprises an electromechanical transducer and an electrical oscillator having an output coupled to the input of said transducer.

3. The apparatus of claim 2, wherein said oscillator is loosely coupled to said transducer to minimize damping of said transducer by said oscillator.

4. The apparatus of claim 2, wherein said electromechanical transducer is a reciprocal transducer.

5. The apparatus of claim 1, wherein said second means comprises a switching network actuatable alternatively to first and second states in response to the level of an input control signal, indicating means actuated by said switching network first state and means for applying a control signal to said switching network in response to said variable modulation of said carrier signal.

6. The apparatus of claim 5, wherein said switching network is normally in said first state.

7. The apparatus of claim 5, wherein said switching network is normally in said first state, and including means responsive to the generation of said carrier signal for applying a control signal to said switching network to releasably hold said switching network in said second state.

8. The apparatus of claim 1, wherein said carrier signal is ultrasonic.

9. The apparatus of claim 1, wherein said first means comprises an oscillator including a first transistor and a first electromechanical transducer having an input coupled to the output of said oscillator, and said second means comprises an amplifier and third means for applying a signal to the input of said amplifier in accordance with said modulated carrier signal, a demodulating network having an input coupled to the output of said amplifier for producing an output corresponding to the varying modulation of said carrier signal, a switching network actuatable alternatively to first and second states in response to the level of an input signal and having its input coupled to the output of said demodulating network, and indicating means actuated by said switching network first state.

10. The apparatus of claim 9, wherein said switching network is normally in said first state and comprising means for applying a bias to the input of said switching network including an AC energized bias network AC coupled to the output of said amplifier whereby said switching network is releasably held in said second state in response to the carrier signal output of said amplifier.

11. The apparatus of claim 9, wherein said third means is coupled to the output of said demodulating network for applying an amplitude control signal to said oscillator transistor to increase the output thereof with an increase in the output of said demodulating network.

12. The apparatus of claim 9, wherein said demodulating network comprises a diode and a relatively high capacity first capacitor connected in series between the output of said amplifier and the input of said switching network the junction of said diode and said first capacitor being grounded through a relatively low capacitance carrier signal by-pass capacitor.

13. The apparatus of claim 9, wherein said transducer is a high frequency permanent magnet speaker.

14. The apparatus of claim 9, wherein said third means comprises a second electromechanical transducer having a mechanical input coupled to the mechanical output of said first transducer through said propagation medium and an electrical output coupled to the input of said amplifier.

15. The apparatus of claim 9, wherein said third means comprises means for connecting the electrical section of said first transducer to the input of said amplifier.

16. The apparatus of claim 9, wherein said oscillator includes a high leakage output transformer having a secondary winding provided with an intermediate tap, and an impedance element, said transducer being connected in series with said impedance element across said secondary winding, said third means including means coupling the signal between said secondary intermediate tap and the junction of said impedance element and said transducer to the input of said first amplifier.

17. The apparatus of claim 9, wherein said first transducer comprises a permanent magnet speaker including a voice coil driving a diaphragm and coupled to said oscillator output through a high leakage transformer.

References Cited

UNITED STATES PATENTS

| | | |
|---|---|---|
| 2,031,951 | 2/1936 | Hartley. |
| 2,333,688 | 11/1943 | Shepard. |
| 2,400,309 | 5/1946 | Kock. |
| 2,769,972 | 11/1956 | MacDonald _____ 340—258 |
| 2,826,753 | 3/1958 | Chapin _____ 340—258 |
| 3,046,519 | 7/1962 | Polster _____ 340—38 |
| 3,047,850 | 7/1962 | Schmidt _____ 340—258 |
| 3,293,631 | 12/1966 | Premack _____ 340—258 |

JOHN W. CALDWELL, *Primary Examiner.*

D. L. TRAFTON, *Assistant Examiner.*